July 12, 1966 — I. W. McROBERTS ET AL — 3,260,041
CASTOR BEAN HARVESTER
Filed Dec. 26, 1963 — 3 Sheets-Sheet 1
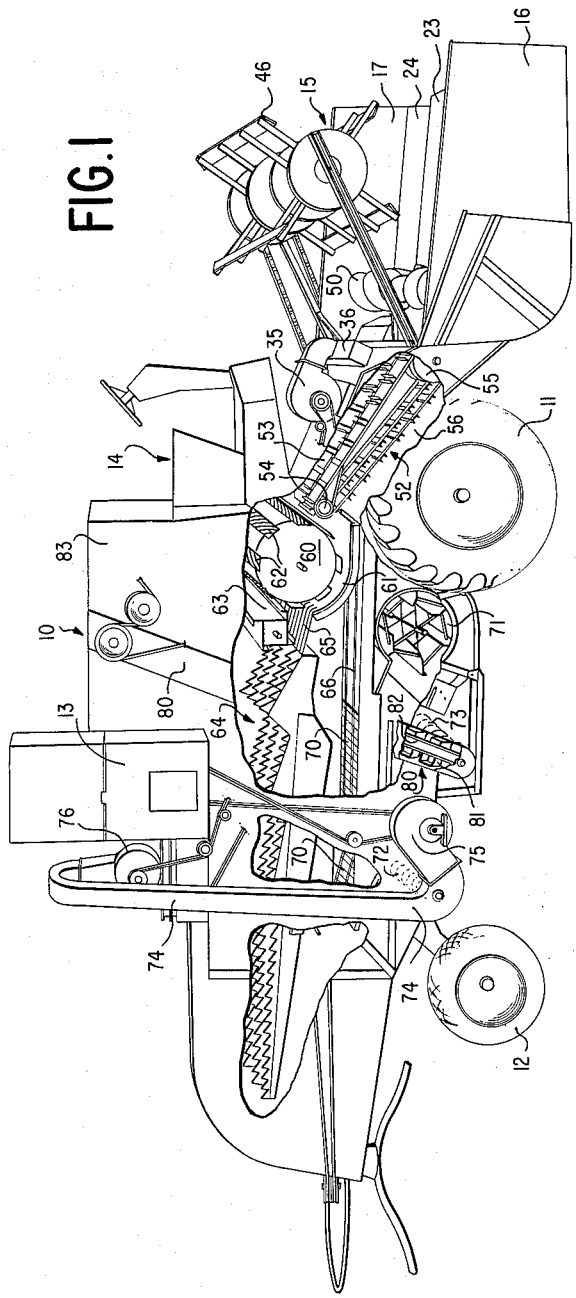
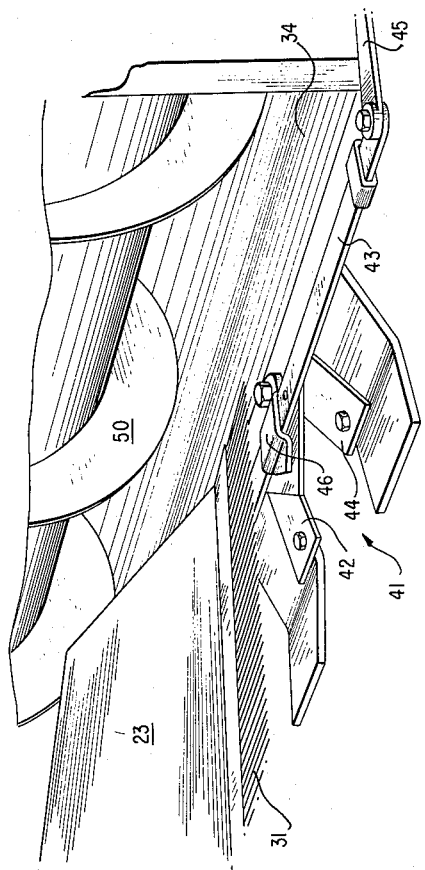
INVENTORS
IRVEN W. McROBERTS
ANDREW D. SHERMAN
BY
ATTORNEYS July 12, 1966  I. W. McROBERTS ETAL  3,260,041
CASTOR BEAN HARVESTER
Filed Dec. 26, 1963  3 Sheets-Sheet 2
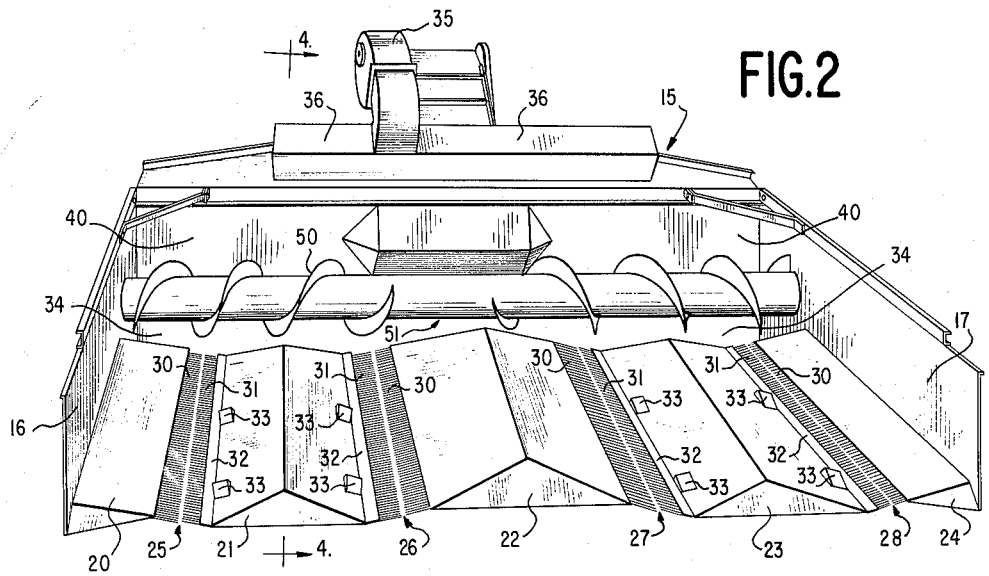
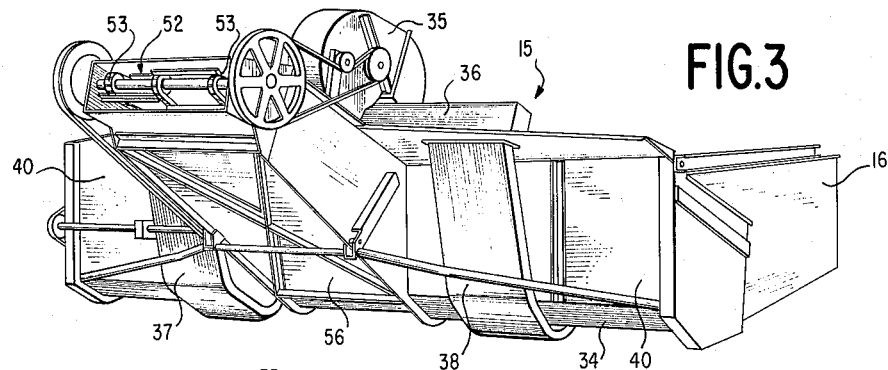
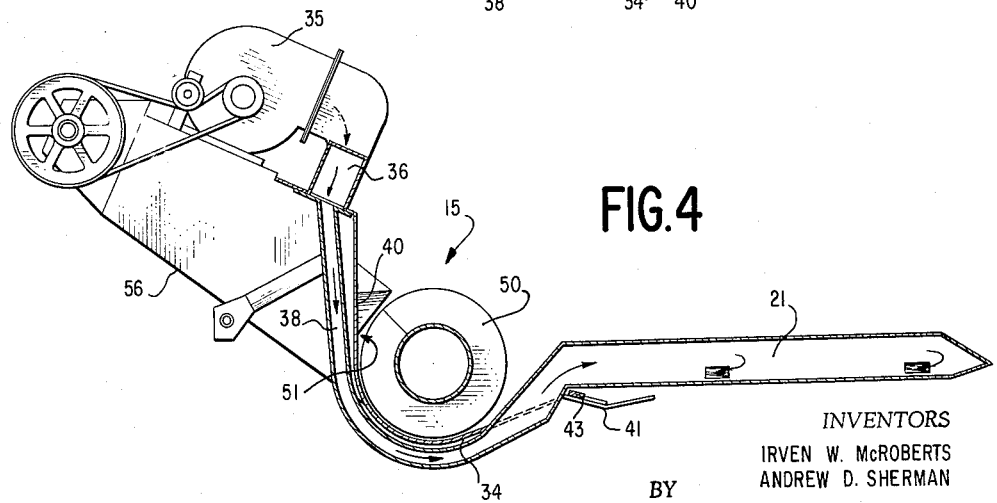
INVENTORS
IRVEN W. McROBERTS
ANDREW D. SHERMAN
BY
Burns, Doane, Benedict, Swecker & Mathis
ATTORNEYS July 12, 1966 I. W. McROBERTS ET AL 3,260,041
CASTOR BEAN HARVESTER
Filed Dec. 26, 1963 3 Sheets-Sheet 3

INVENTORS
IRVEN W. McROBERTS
ANDREW D. SHERMAN
BY
*Burns, Doane, Benedict, Swecker & Mathis*
ATTORNEYS United States Patent Office 3,260,041
Patented July 12, 1966

3,260,041
CASTOR BEAN HARVESTER
Irven W. McRoberts and Andrew D. Sherman, Hastings, Nebr., assignors to Enterprise, Inc., Hastings, Nebr., a corporation of Nebraska
Filed Dec. 26, 1963, Ser. No. 333,395
4 Claims. (Cl. 56—119)

This invention relates to harvesting equipment and, more particularly, to apparatus for the harvesting of castor beans.

The harvesting of a castor bean crop has always presented special problems due to the peculiar nature of the castor bean and to the fickle nature of its attachment to the plant. Under some conditions, castor bean pods can be shaken from the plant with little difficulty. The ease with which castor beans sometimes separate from the plant has led to the widespread method of harvesting by which the plant is shaken or beaten while still in the ground and the bean pods are caught as they fall. This is generally accomplished through the use of an advancing cage-like apparatus with moving beaters or vibrators therein to knock the castor bean plants as the cage advances about them. Even under ideal harvest conditions, however, such harvesting apparatus is not without its disadvantages. The violence involved in beating the pods from the plants can result in damage to a substantial portion of the harvested crop. It can also result in the castor beans and pods bouncing off the interior of the advancing cage and being lost through the front opening of the harvesting equipment before the beans or pods can be caught.

The castor bean pod does not, however, always drop with ease from the plant at harvest time. Especially under humid conditions, it is frequently difficult to separate the pod from the plant and if the beaters customarily employed in the harvesting equipment do not contact the pods directly, as is often the case, the pods may remain on the plant and be dragged to the ground as the harvester advances onward. The percentage of bean pods lost in this manner tends to increase with an increase in humidity. above a humidity of 55% it is possible to have crop losses of as much as a third of the crop with harvesters employing the beating principle. For this reason, the harvesting of castor beans is often delayed until the humidity condition is low.

This invention has as a principal object the provision of novel harvesting equipment and attachments therefor which permit the harvesting of castor beans with improved crop yields under a wide variety of conditions.

By way of a brief summary of a preferred embodiment of the invention, a harvesting combine is provided in which a combination harvesting operation is carried out. On the forward end of the harvester an attachment to the combine is constructed with generally horizontal apron-like extensions thereon located close to the ground with longitudinal slots extending forward in the direction of movement of the combine. Lining the slots on opposite sides thereof are flexible opposed fingers or brushes which provide a yieldable barrier for closing the slot. As the harvester and its front end attachment move over the ground, the rows of castor bean plants enter the slots from front to rear, and any castor beans or pods which fall from the plants at this point are caught by the apron-like extensions and the yieldable barrier and directed towards the rear of the harvester combine. At the extreme rear end of each of the slots and beneath the same a heavy duty cutter slices the castor bean plant off close to the ground. Instead of the castor bean plant being beaten, it is gathered gently in almost in its entirety along with such loose parts and beans as may fall therefrom during the advance of the harvester. Thereafter, the entire castor bean plant is directed by an auger and other conveying means to a fully shielded interior portion of the harvester where operations are performed on the castor bean plants to separate the pods and beans therefrom. In this way the harvesting of castor beans is simplified and accelerated by apparatus which gently gathers in the castor bean plant along with any prematurely separated beans and pods. In the practice of this invention, it is not necessary to wait for the humidity to drop and the harvest can be carried out when conditions are quite moist. If the ambient moisture renders it diffcult to remove the castor beans from their hulls in the field, it is still possible to harvest in the field and to store the unhulled castor beans until they can be dried and hulled at a later date.

Although the present invention is not to be limited except by the scope of the appended claims, further details of the invention itself, as well as additional objects and advantages, may best be understood in connection with the following more complete description taken together with the accompanying drawings wherein:

FIGURE 1 is a side view of a harvester combine constructed according to the principles of this invention with portions thereof broken away to reveal certain working relationships;

FIGURE 2 is a perspective front view of the attachment at the forward end of the combine shown in FIGURE 1;

FIGURE 3 is a perspective rear view of the attachment shown in FIGURE 2;

FIGURE 4 is a cross-sectional side view taken on line 4—4 of FIGURE 2;

FIGURE 5 is a perspective view of part of the front end attachment of FIGURE 2 with a portion removed to to reveal one of the heavy duty plant cutters mounted thereon;

Figure 6:
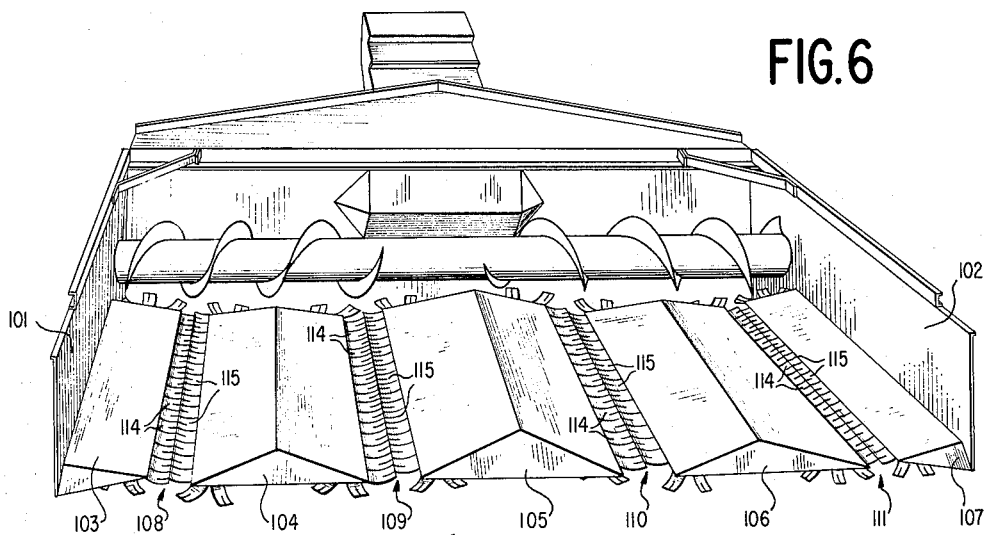
FIGURE 6 is a perspective front view of a front end harvester attachment constructed in accordance with an alternate embodiment of the invention.

The principal and preferred embodiments of the invention revealed in the following description of the invention will be seen to be in the form of a typical commercially available grain harvesting combine to which certain modifications have been made and attachments added. In fact, one of the special virtues of the invention resides in the fact that it can be embodied in such a combine without great difficulty and without permanently altering or destroying the basic versatility of the combine. It will be recognized, however, that not only could the invention be employed in connection with other forms of specially adapted combines or harvesters, but it may also be embodied in a structure designed solely and exclusively for the harvesting of castor beans.

With this in mind, there is to be seen in FIGURE 1 in perspective and from the side a harvesting combine with portions thereof cut away to reveal the internal structure and cooperation of certain of its parts. The combine includes a basic body portion 10 carried on widely spaced forward traction wheels 11 and steerable rear wheels 12. Mounted on the body portion 10 within housing 13 is a source of motive power, an internal combustion engine, for moving the combine along the rows of plants to be harvested and for providing the driving power to operate many moving parts of the combine. On combines of this general nature it is not uncommon to drive fans, elevators, feeders, separators and other mechanisms by means of belts, sprocket chains and the like driven either by the engine or by one or more electric motors deriving their power from a generator driven by the engine. Because mechanical driving means of these types are so well known and because they are not the subject of this invention, the drawing in FIGURE 1 has been simplified by eliminating some of the driving connections and parts of others. At the forward part of the body an operator's station 14 is located at a relatively high level to give the operator a good view of the harvesting operation as carried on by the apparatus. In FIGURE 1 the grain header typically associated with such a basic structure is replaced by a specialized attachment, indicated generally at 15, constructed in accordance with the principles of this invention.

As seen more clearly in FIGURE 2, the attachment 15 comprises vertical side walls 16 and 17 on opposite sides thereof and, between the sidewalls, a plurality of projecting aprons 20, 21, 22, 23 and 24 which extend ahead of the combine and between which are defined plant receiving passageways 25, 26, 27 and 28. Lining the sides of each of the passageways can be seen rows of inwardly directed resiliently displaceable barrier members which in the FIGURE 2 embodiment are shown in the form of brushes 30 and 31. These brushes constitute yieldable barriers which gently surround the stalks of the castor bean plants as the harvester advances along the rows of plants. Should this initial contact between the plant and the combine result in dislodging any castor beans or pods prematurely from the plants, such beans or pods fall to the surface of the aprons or upon the yieldable barriers provided by the brushes. The upper surfaces of the aprons angle downward on either side.

It is to be noted that the lowest surface areas on this portion of the combine attachment are along the outer edges of aprons 21 and 23. These two aprons of the five are provided with troughs 32 along each side, and the brushes 31 immediately adjacent troughs 32 are angled upwardly from the trough areas. Brushes 30, on the other hand, being affixed to aprons not provided with trough areas angle downwardly. Hence the upper surface of each yieldable barrier comprising a brush member 30 and a brush member 31 angles downward toward the side of the passageway on which the trough is positioned. Hence, any of the fruit of the plants which falls upon apron or brush rolls downward toward a trough either on apron 21 or on apron 23.

Each of the aprons 21 and 23 is constructed hollow to form pressure chambers into which air may be pumped and from which air may be blown. Air is blown from the pressure chambers toward the rear through ports 33 adjacent the bottom of the troughs to blow fallen plant products rearward to positions on platform 34 where they can be gathered up. As best seen in the back view of the attachment 15 shown in FIGURE 3 and in the cross-sectional view shown in FIGURE 4, a belt driven fan 35 is mounted at the top and rear of the front attachment 15 to compress air and blow it in the direction indicated by the arrows into a hollow distributor 36 and thence down passageways 37 and 38 behind the rear surface 40 of the attachment 15 and underneath platform 34 into the interior pressure chamber of each of the hollow aprons 21 and 23. This arrangement of a pressure chamber within only two of the aprons, fed from behind and below the front end harvesting attachment with air from the fan, results in a structure whose parts are located close to the ground during the harvesting operation without obstructing the view of the operator of the combine. It also results in a simple compact structure, so that when the attachment is removed from the combine for storing between harvests it requires but little space.

At the rear or aft end of each passageway located in a position immediately below the resilient yieldable barrier is a heavy duty plant cutter 41 as best shown in FIGURE 5. In this illustration the apron 24 is removed to provide an unobstructed view of the cutter. The cutter includes a sickle blade 42 driven back and forth by sickle bar 43 to which it is riveted to cooperate scissors-like with a stationary cutter blade 44. Sickle bar 43 receives its reciprocating motion from a connecting pitman 45 which will be recognized as a standard part of a grain combine. Clamp 46, while permitting the sickle bar 43 and sickle blade 42 to slide under it, holds the sickle blade firmly against cutter blade 44 to shear the comparatively thick castor bean stalks. In this manner, contrary to the typical practice of harvesting castor beans by beating the plant, the entire plant minus only the lowest portion of the stalk and its root sections is removed from the field to be gathered into the harvester. In this operation the well-known revolving over-riding reel 48 assists by sweeping the castor bean plants into the cutter and back onto platform 34. It will be recognized, however, that the cutting of the plant is accomplished after the aprons and the resilient barriers mounted thereon have advanced well past the plant so that any fruit of the plant which falls during the cutting operation is caught by the aprons and directed rearwardly along with the entire castor bean plant. Consequently, beans, pods and plants are all gathered in by auger 50 which revolves clockwise as seen in FIGURES 1 and 4 during the passage of the combine over the field. The two reverse-pitched blades of the auger direct the material on platform 34 to a crop inlet opening 51 (not visible in the drawings) on the center axis of the combine from which opening, as best seen in FIGURE 1, the stalk is lifted by an undershot feeder 52 up toward the interior of the combine, wherein subsequent operations are performed on the bulk material introduced therein to separate the pods from the plants and the beans from the pods in a manner to be described. Feeder 52 in the example shown comprises sprocket chains 53 with toothed projections thereon driven around sprocket wheels 54 and 55 to sweep the bulk material directed into it by the auger 50 up an inclined ramp 56 and to discharge the bulk plant material rearward at the end of the ramp.

The bulk material elevated by the undershot feeder is fed into the region between cylinder 60 and the curved plate 61, called a concave, just below the cylinder. The typical grain harvester is provided with a sieve-like concave below the cylinder the distance of which from the cylinder may be varied. In adapting a grain harvester of this type, the apertured concave is preferably dropped to its lowest position and covered with a smooth steel concave 61 as shown in FIGURE 1. The speed of rotation of the cylinder 60 is preferably adjusted to approximately 350 to 375 r.p.m. to shake the pods from the stalk. The smooth steel concave assures that there will be no damage to the castor bean. The rotating cylinder with its superficial ridged plates 62 exerts a massaging action upon the stock fed to it, thereby to work the stock and induce a separation of bean pods from the plants. The bulk material so loosened is then directed rearward by the clockwise rotation of the rotary sweeper 63 and onto the top of the straw rack 64. As the stock is swept onto the straw rack 64 it passes over a series of spaced-apart wire fingers 65 which permit most of the loosened bean pods to drop through onto the grain pan 66 beneath. The grain pan may be given a shaking action to work the pods evenly toward the rear onto the sieve surfaces 70. The straw rack 64 is of a conventional type consisting of a series of elongated toothed members driven by crank shafts (not shown in the drawing) in alternating directions to impart a shaking or threshing action to the material discharged upon it. In doing this the straw rack threshes the bean pods loose from the bulk plant material permitting the pods to drop between the toothed straw rack members to the sieve surfaces 70 below and directing the remainder of the plant material toward the rear of the harvester where it is eventually discharged through an opening (not visible in the drawing) onto the field below.

The threshing action of the straw rack is aided in a well known manner by the wind set up by a large fan 71. This wind is directed to the rear up through sieve surfaces 65 and the straw rack 64. The wind current blows trash and loose plant stock rearward but permits the more dense material of the beans and pods to drop and be sorted by the sieve surfaces 70.

Sieve surfaces 70 exert a sorting action upon the beans and pods so that the pods with the beans still in them are directed rearward where they drop onto a return auger 72 whereas the whole beans are directed to a more forward position onto return auger 73. Both of these augers in rotating direct the product which falls onto them over to the side of the harvesting combine for transportation to other places. The unhulled beans are directed by auger 72 into conduit 74 in which a strong air current is set up by fan 75. This air current blows the unhulled pods up the conduit 74 either for storage or for further processing. Depending on the humidity and the condition of the beans and pods, the unhulled pods may be directed through conduit 74 to a huller 76 mounted on top of the combine. The huller may include a rubber covered drum and rubber covered concave, the operation of which are generally well known. The huller massages the pods and opens them to loosen the beans therefrom. The output of the huller may then be directed back onto the straw racks in the interior of the combine where complete separation of the castor beans from the loosened hulls may be accomplished. Alternatively, instead of the castor bean pods being hulled in the harvester, the pods may simply be stored in a container for subsequent drying and hulling.

Hulled beans separated from the plant materials by sieve surfaces 70 are directed to auger 73 which transports them to an elevator 80 preferably fitted with rubber covered buckets 81 mounted on an endless travelling belt 82 to carry the hulled beans to a bin 83 located at the top of the harvester where they are dumped.

In FIGURE 6 is shown an alternate form of a front end attachment constructed according to this invention to adapt a grain harvesting combine for harvesting castor bean crops. The superficial similarity between the FIGURE 6 attachment and that shown in FIGURE 2 is apparent. The general mode of operation of the FIGURE 6 attachment is similar to that previously described but with important differences. This attachment structure is also provided with side shields 101 and 102 between which are positioned a series of apron-like extensions 103, 104, 105, 106 and 107 separated each from the other by elongated fore-and-aft passageways or slots 108, 109, 110 and 111. Each passageway is closed by yieldable barrier members constructed to permit a row of plants to be received in the passageway as the aprons move past the plant on either side while nevertheless preventing any dislodged beans or pods from falling through the passageway to the ground. Instead of the brushes described in the previous example, however, the yieldable barrier in this case comprises rows of rubber or rubber-like blades 114 and 115 lining each side of the passageway and converging inwardly across the respective passageways into engagement with each other. These blades are slit lengthwise at their contacting ends to increase their tip flexibility. Being flattened the blades have somewhat more flexibility in a vertical dimension than they have horizontally.

Rubber blades 114 and 115 form not only a resilient barrier in each of the passageways 108, 109, 110 and 111 but also a trough. The sloping upper surfaces of the apron-like extensions angle downward on each side toward the passageway so that any plant products which fall from a plant about which the aprons have advanced, roll or slide off the upper surfaces of the aprons and onto one of the barriers. Such fallen plant products are directed rearward not by a stream of air as in the previous example but by the barrier itself since in this case the barrier travels rearward as a conveyor.

Figure 7:
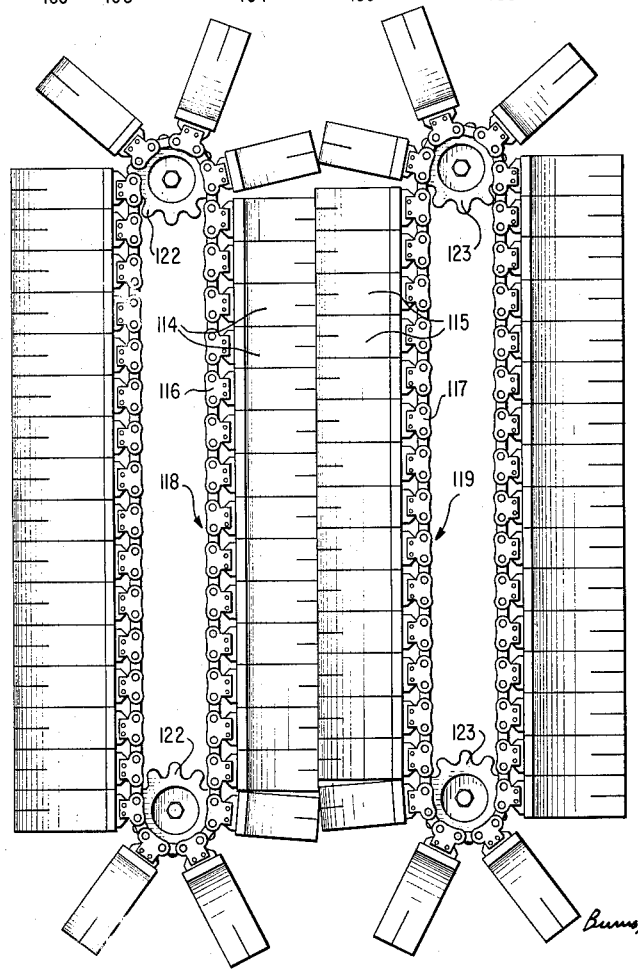
FIGURE 7 is a top plan view of a portion of the attachment shown in FIGURE 6.
Figure 8:
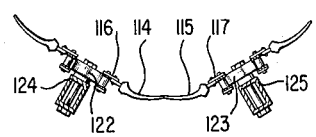
FIGURE 8 is a cross-sectional view take non line 8—8 of FIGURE 7.

As seen in FIGURES 7 and 8, blades 114 and 115 are mounted on separate links 116 and 117 of sprocket chains 118 and 119. The chains in turn are stretched respectively around sprocket wheels 122 mounted under the apron on the one side of the passageway and sprocket wheels 123 under the apron on the other side. Although it is possible, and some may find it desirable, to provide a driving mechanism to put in motion the sprocket wheels and their associated sprocket chains, we prefer to provide no such driving mechanism. Instead the sprocket wheels 122 and 123 are mounted to rotate freely about their axes on bearings 124 and 125 fixed beneath the aprons. The motion imparted to the resilient barrier members to transport plant products to the rear is given them by contact with the plants themselves. As a plant enters a passageway and comes in contact with the tips of the resilient barrier members, the tips deflect vertically to surround the stalk of the plant gently. Forward movement of the combine attachment results in the plant exerting a rearwardly directed force on the barrier members 114 and 115 setting the barrier members in motion thereby to convey to the rear any plant products which fall or have fallen on their upper trough-shaped surfaces.

The rest of the front end attachment shown in FIGURE 6 is similar to the preceding example except for the absence of pressure chambers in any of the apron extensions and of an associated fan. There is at the rear of each of the elongated passageways 108, 109, 110 and 111 a plant cutter (not visible in FIGURE 6) for severing plants as they reach that position. Plants and plant products are gathered together on platform 129 and swept by the rotating auger to a central position where they are transported into the shielded interior of the combine for common treatment to separate all the plant products from the plants.

The invention has been described of necessity in the form of specific embodiments. It should be understood, however, that these embodiments are intended primarily as illustrative of the principles of the invention and not limiting on its scope. Certain modifications and substitutions other than those specifically described or mentioned herein will doubtless occur to those skilled in the arts to which the invention pertains. The appended claims are intended to cover all such modifications and substitutions as fall within the true spirit and scope of the invention in its broader aspects.

What we claim as new and desire to secure by Letters Patent of the United States is:

1. In a harvester for castor bean crops or the like:
a mobile structure adapted for movement over a ground surface;
at least a pair of forwardly projecting apron-like extensions on said structure spaced laterally apart to provide an elongated fore-and-aft passageway to receive a row of plants therein, the upper surfaces of both of said apron-like extensions sloping downward toward said passageway;
resilient barrier members lining said passageway on opposite sides thereof and converging inwardly to form a yieldable barrier permitting plant stalks to be received in said passageway as said structure advances over the ground but preventing plant products from falling vertically through said passageway to the ground;
means including looped conveyor members mounting said barrier members for movement rearward along said passageway to carry plant products thereon toward the rear of said structure, said conveyor members being moved by the force exerted on said barrier members by plants received in said passageway; and
means at the aft end of said passageway for gathering in plant products delivered thereto by said movable barrier members.

2. In a harvester for castor bean crops or the like:
   a structure adapted for movement over a ground surface having a rear wall with a crop inlet opening therein and a platform extending forward from said rear wall for receiving plant products thereon;
   auger means located in front of said rear wall and over said platform for directing plant products on said platform into said crop inlet opening;
   at least a pair of forwardly projecting apron-like extensions on said structure spaced laterally apart to provide an elongated fore-and-aft passageway to receive a row of plants therein, the upper surfaces of both of said apron-like extensions sloping downward toward said passageway;
   resilient barrier members lining said passageway on opposite sides thereof and converging inwardly to form a yieldable barrier permitting plant stalks to be received in said passageway as said structure advances over the ground but preventing plant products from falling vertically through said passageway to the ground;
   means including looped conveyor members mounting said barrier members for movement rearward along said passageway to carry plant products thereon onto said platform, said conveyor members being moved by the force exerted on said barrier members by plants received in said passageway.

3. In an apparatus for harvesting castor beans or the like:
   a structure adapted for movement over a ground surface having a rear wall with a crop inlet opening therein and a platform extending forward from said rear wall for receiving plant products thereon;
   auger means located in front of said rear wall and over said platform for directing plant products on said platform into said crop inlet opening;
   at least a pair of forwardly projecting apron-like extensions on said structure spaced laterally apart to provide an elongated fore-and-aft passageway to receive a row of plants therein, the upper surfaces of both of said apron-like extensions sloping downward toward said passageway;
   a pair of sprocket wheels journalled for rotation beneath each of said apron-like extensions adjacent said passageway and at opposite ends thereof;
   a pair of sprocket chains looped about each of said pair of sprocket wheels to extend parallel to said passageway on opposite sides thereof; and
   resilient barrier members mounted on each of said sprocket chains and converging across said passageway to form a yieldable barrier permitting plant stalks to be received in said passageway as said structure advances over the ground but preventing plant products from falling through said passageway to the ground, said sprocket chains being movable by the force exerted on said barrier members by plants received in said passageway thereby to carry plant products fallen upon said yieldable barrier toward the aft end of said passageway and onto said crop-receiving platform.

4. In an apparatus for harvesting castor beans or the like:
   a structure adapted for movement over a ground surface having a rear wall with a crop inlet opening therein and a platform extending forward from said rear wall for receiving plant products thereon;
   auger means located in front of said rear wall and over said platform for directing plant products on said platform into said crop inlet opening;
   at least a pair of forwardly projecting apron-like extensions on said structure spaced laterally apart to provide an elongated fore-and-aft passageway to receive a row of plants therein, the upper surfaces of both of said apron-like extensions sloping downward toward said passageway;
   a pair of sprocket wheels journalled for rotation beneath each of said apron-like extensions adjacent said passageway and at opposite ends thereof;
   a pair of sprocket chains looped about each of said pair of sprocket wheels to extend parallel to said passageway on opposite sides thereof;
   resilient barrier members mounted on each of said sprocket chains and converging across said passageway to form a yieldable barrier permitting plant stalks to be received in said passageway as said structure advances over the ground but preventing plant products from falling through said passageway to the ground, said sprocket chains being movable by the force exerted on said barrier members by plants received in said passageway thereby to carry plant products fallen upon said yieldable barrier toward the aft end of said passageway and onto said crop-receiving platform; and
   means for severing plants at the aft end of said passageway and delivering the same to said crop-receiving platform together with the said fallen plant products.

References Cited by the Examiner
UNITED STATES PATENTS

| | | | |
|---|---|---|---|
| 1,948,975 | 2/1934 | Urschel | 56—19 |
| 2,528,275 | 10/1950 | Heth | 56—20 |
| 2,575,120 | 11/1951 | Peel | 56—23 |
| 2,734,331 | 2/1956 | Phillips | 56—296 |
| 2,862,345 | 12/1958 | Wigham | 56—119 |
| 2,867,961 | 1/1959 | Heilburn | 56—119 |
| 3,073,098 | 1/1963 | Farrar et al. | 56—19 |

ANTONIO F. GUIDA, *Primary Examiner.*

ABRAHAM G. STONE, *Examiner.*

J. O. BOLT, *Assistant Examiner.*